(12) United States Patent
Nakamura et al.

(10) Patent No.: US 9,174,694 B2
(45) Date of Patent: Nov. 3, 2015

(54) EXHAUST GAS SENSOR ARRANGEMENT STRUCTURE FOR MOTORCYCLE

(71) Applicant: HONDA MOTOR CO., LTD., Tokyo (JP)

(72) Inventors: Kenichiro Nakamura, Wako (JP); Yuta Abe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/157,608

(22) Filed: Jan. 17, 2014

(65) Prior Publication Data

US 2014/0209401 A1 Jul. 31, 2014

(30) Foreign Application Priority Data

Jan. 30, 2013 (JP) ................................. 2013-015372

(51) Int. Cl.
*B60K 13/04* (2006.01)
*B62K 11/04* (2006.01)

(52) U.S. Cl.
CPC ...................................... *B62K 11/04* (2013.01)

(58) Field of Classification Search
CPC ................................. B60K 13/04; F01N 13/08
USPC .......................................... 180/309, 219, 225
See application file for complete search history.

(56) References Cited

U.S. PATENT DOCUMENTS

| | | | | | |
|---|---|---|---|---|---|
| 5,271,477 | A | * | 12/1993 | Gekka et al. | 180/219 |
| 7,004,276 | B2 | * | 2/2006 | Iizuka et al. | 180/89.17 |
| 7,094,267 | B2 | * | 8/2006 | Inayama | 55/385.3 |
| 8,393,433 | B2 | * | 3/2013 | Inoue et al. | 180/309 |
| 8,439,142 | B2 | * | 5/2013 | Kajiwara et al. | 180/68.3 |
| 8,584,788 | B2 | * | 11/2013 | Ishibe | 180/309 |
| 8,690,192 | B2 | * | 4/2014 | Yanagita | 280/851 |
| 8,783,024 | B2 | * | 7/2014 | Ono et al. | 60/299 |
| 2002/0096385 | A1 | * | 7/2002 | Kuji et al. | 180/309 |
| 2004/0129482 | A1 | * | 7/2004 | Takenaka et al. | 180/309 |
| 2010/0187036 | A1 | * | 7/2010 | Locati et al. | 180/219 |
| 2013/0220724 | A1 | * | 8/2013 | Yazaki et al. | 180/309 |
| 2014/0131127 | A1 | * | 5/2014 | Hayama | 180/219 |

FOREIGN PATENT DOCUMENTS

JP 4057145 B2 3/2008

* cited by examiner

*Primary Examiner* — Joseph Rocca
*Assistant Examiner* — Marlon Arce
(74) *Attorney, Agent, or Firm* — Birch, Stewart, Kolasch & Birch, LLP

(57) ABSTRACT

An exhaust gas sensor arrangement structure for a motorcycle includes a vehicle body frame, an internal combustion engine suspended on the vehicle body frame between front and rear wheels and exhaust pipes extending toward a rear side in the longitudinal direction of a vehicle from a front side of the internal combustion engine in the longitudinal direction of the vehicle in a state where the exhaust pipes extend below the internal combustion engine. Exhaust gas sensors are arranged on upper halves of the exhaust pipes arranged between the internal combustion engine and the bottom frame portions as viewed from a front side in the longitudinal direction of the vehicle in a state where the exhaust gas sensors are sandwiched between the internal combustion engine and the bottom frame portions as viewed from a front side in the longitudinal direction of the vehicle.

14 Claims, 7 Drawing Sheets

EXHAUST GAS SENSOR ARRANGEMENT STRUCTURE FOR MOTORCYCLE

CROSS-REFERENCE TO RELATED APPLICATIONS

The present application claims priority under 35 USC 119 to Japanese Patent Application No. 2013-015372 filed Jan. 30, 2013 the entire contents of which are hereby incorporated by reference.

BACKGROUND OF THE INVENTION

1. Field of the Invention

The present invention relates to the exhaust gas sensor arrangement structure for a motorcycle where an exhaust gas sensor is protected.

2. Description of Background Art

An exhaust pipe which extends below an internal combustion engine of a motorcycle is known wherein an exhaust gas sensor is arranged on an upper surface of a portion of the exhaust pipe positioned behind an oil pan of the internal combustion engine. See, for example, Japanese Patent 4,057,145. See, for example, FIGS. 2 to 5.

In the exhaust gas sensor disclosed in Japanese Patent 4,057,145, the exhaust gas sensor is arranged above the center in the vehicle width direction and on an upper surface of a portion having a relatively large width in the vicinity of a confluent portion where four exhaust pipes are merged in the extending direction. Accordingly, a space below the exhaust gas sensor is widely protected by the exhaust pipe.

However, depending on a vehicle, there may be a case where an exhaust pipe cannot be arranged in a state where the exhaust pipe passes the center in the vehicle width direction or a case where the exhaust gas sensor cannot be arranged on an upper surface of the exhaust pipe having a large width. There has been a demand for a exhaust gas sensor arrangement structure where an exhaust gas sensor can be protected even when the exhaust pipe is arranged on one side of a vehicle in an offset manner as described above.

SUMMARY AND OBJECTS OF THE INVENTION

In view of the above-mentioned prior art, it is an object of an embodiment of the invention to provide the exhaust gas sensor arrangement structure for a motorcycle where an exhaust gas sensor can be protected even when an exhaust pipe is arranged on a side of a vehicle in an offset manner To overcome the above-mentioned drawback, an embodiment of the present invention is directed to an exhaust gas sensor arrangement structure for a motorcycle that includes a vehicle body frame; an internal combustion engine suspended on the vehicle body frame between front and rear wheels and exhaust pipes extending toward a rear side in the longitudinal direction of a vehicle from a front side of the internal combustion engine in the longitudinal direction of the vehicle in a state where the exhaust pipes extend below the internal combustion engine. The vehicle body frame includes a pair of left and right bottom frame portions extending toward a rear side in the longitudinal direction of a vehicle body while extending along both sides of a lower portion of the internal combustion engine. Exhaust gas sensors are arranged on upper halves of the exhaust pipes arranged between the internal combustion engine and the bottom frame portions as viewed from a front side in the longitudinal direction of the vehicle in a state where the exhaust gas sensors are sandwiched between the internal combustion engine and the bottom frame portions as viewed from a front side in the longitudinal direction of the vehicle.

According to an embodiment of the present invention, the center axes of the exhaust gas sensors are arranged with upper portions thereof inclined toward the outside in the vehicle width direction with respect to a vehicle center vertical line in a state where the center axes are directed toward positions between the internal combustion engine and the bottom frame portions.

According to an embodiment of the present invention, angles at which the center axes of the exhaust gas sensors intersect with the vertical line are set to angles which do not exceed approximately ½ of a right angle on an acute angle making side.

According to an embodiment of the present invention, a plurality of exhaust pipes are arranged in a state where the exhaust pipes extend along both left and right sides of the internal combustion engine below the internal combustion engine respectively, and the exhaust gas sensors are arranged on the exhaust pipes on both left and right sides in an inclined manner with respect to the vertical direction.

According to an embodiment of the present invention, an oil pan is arranged on a lower portion of the internal combustion engine and the exhaust pipes are arranged between the oil pan and the bottom frame portions. The oil pan is formed asymmetrically in the lateral direction with respect to the center in the vehicle width direction and projects downward between the exhaust pipes which extend along both left and right sides of the internal combustion engine below the internal combustion engine. The exhaust gas sensors are arranged with the inclination angles of the center axes with respect to the vertical line made different from each other so as to avoid interference with the oil pan.

According to an embodiment of the present invention, portions of the upper halves of the exhaust pipes overlap with the bottom frame portions respectively as viewed in a side view with sensor mounting portions for the exhaust gas sensors being arranged in an overlapping range.

According to an embodiment of the present invention, the exhaust gas sensor is arranged on the exhaust pipe in a state where the whole of an exposure portion of the exhaust gas sensor which is exposed from the exhaust pipe is covered with the bottom frame portion as viewed in a side view.

According to an embodiment of the present invention, the oil pan is formed in a state where the oil pan bulges in the vehicle width direction in front of the exhaust gas sensors. The exhaust gas sensors are covered with bulging portions of the oil pan as viewed from a front side in the longitudinal direction of the vehicle.

According to an embodiment of the present invention, the exhaust gas sensors are arranged on the upper halves of the exhaust pipes arranged between the internal combustion engine and the bottom frame portions in a state where the exhaust gas sensors are sandwiched between the internal combustion engine and the bottom frame portions. Accordingly, the exhaust gas sensors have a lower side thereof surrounded by the exhaust pipes and both sides thereof surrounded by the internal combustion engine and the bottom frame portions in a state where the exhaust gas sensors are arranged close to the exhaust pipes, the internal combustion engine and the bottom frame portions. Thus, it is possible to protect the exhaust gas sensors by making use of the members around the exhaust gas sensors.

According to an embodiment of the present invention, the following advantageous effect can be acquired. The center axes of the exhaust gas sensors are arranged with upper portions thereof inclined toward the outside with respect to the vehicle center vertical line. Thus, as viewed from front and rear wheel sides arranged at the center in the vehicle width direction, areas of the exhaust gas sensors covered with the exhaust pipes can be increased thus protecting the exhaust gas sensors more effectively. Further, the thermal effects on the exhaust gas sensors can be suppressed by arranging the exhaust gas sensors away from the internal combustion engine.

According to an embodiment of the present invention, by setting the inclination angle to an angle which does not exceed ½ of a right angle, the exhaust gas sensors can be surely protected from scattering material from below the internal combustion engine and from wheels by the exhaust pipes.

According to an embodiment of the present invention, both of the exhaust gas sensors which are respectively arranged on the exhaust pipes on both left and right sides below the internal combustion engine can be protected by the internal combustion engine and the bottom frame portion.

According to an embodiment of the present invention, the plurality of exhaust gas sensors are arranged in a state where the exhaust gas sensors avoid the laterally asymmetrical oil pan. Thus, the oil pan and the bottom frame portion can protect the exhaust gas sensors in a cooperative manner.

According to an embodiment of the present invention, the side surfaces of the exhaust gas sensors are covered with the bottom frame portion so that the exhaust gas sensors can be protected.

According to an embodiment of the present invention, a side of the whole exposure portion of the exhaust gas sensor is covered with the bottom frame portion so that the exhaust gas sensor can be protected from the side.

According to an embodiment of the present invention, the oil pan is arranged in a state where the bulging portion of the oil pan which bulges in the vehicle width direction covers a front surface of the exhaust gas sensor so that the exhaust gas sensor can be protected from the front side.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
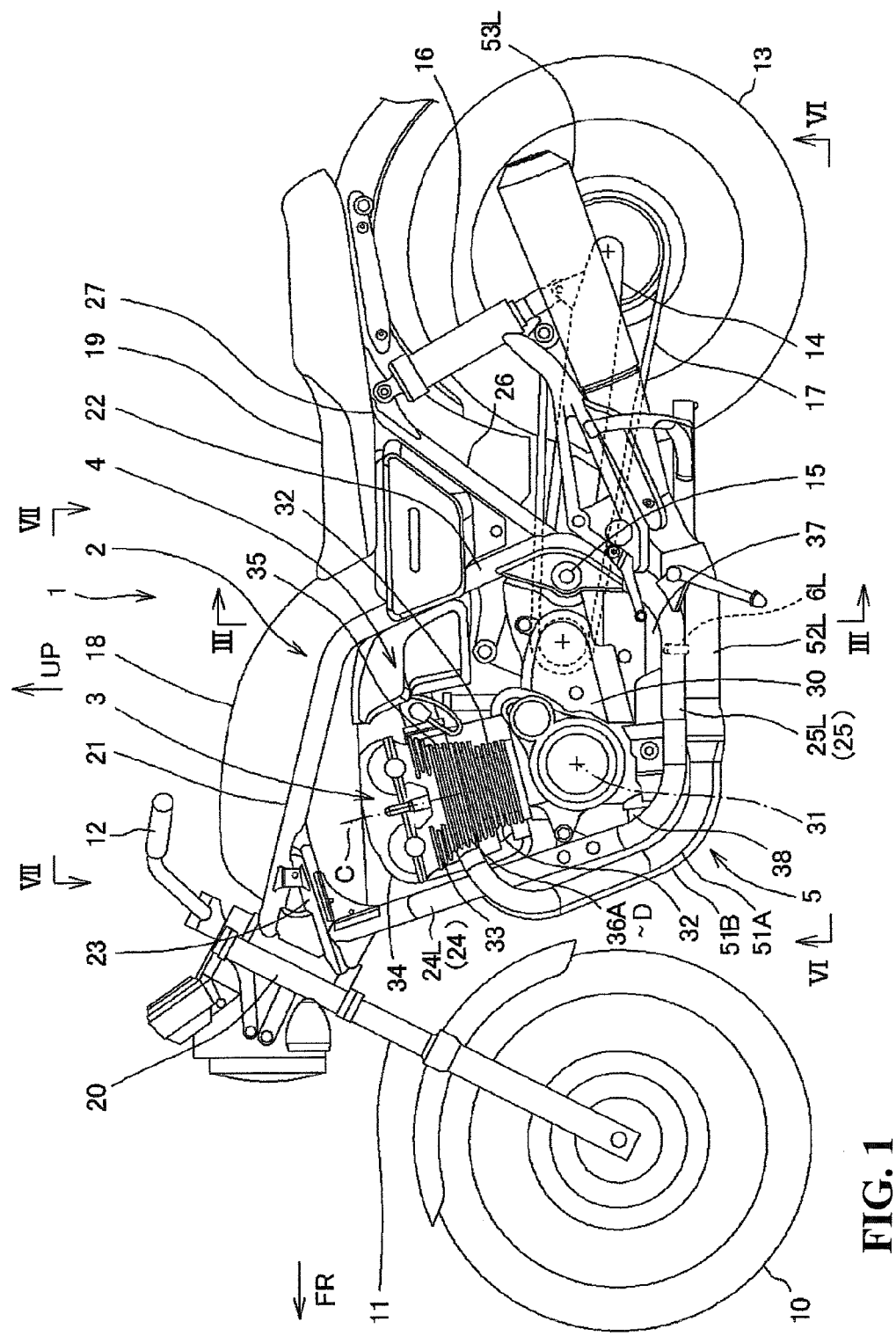
FIG. 1 is a left side view of a motorcycle provided with the exhaust gas sensor arrangement structure according to one embodiment of the invention with a part of a fuel tank broken away.

The exhaust gas sensor arrangement structure for a motorcycle according to one embodiment of the invention is explained in conjunction with FIGS. 1 to 7.

In the following explanation, the directions such as "front," "rear," "left," "right," "up" and "down" are determined in accordance with the directions of a vehicle (motorcycle) in a state where the exhaust gas sensor arrangement structure of this embodiment is provided on the motorcycle.

In the drawing, an arrow FR indicates the frontward direction of the vehicle, an arrow LH indicates the leftward direction of the vehicle, an arrow RH indicates the rightward direction of the vehicle and an arrow UP indicates the upward direction of the vehicle respectively.

Figure 2:
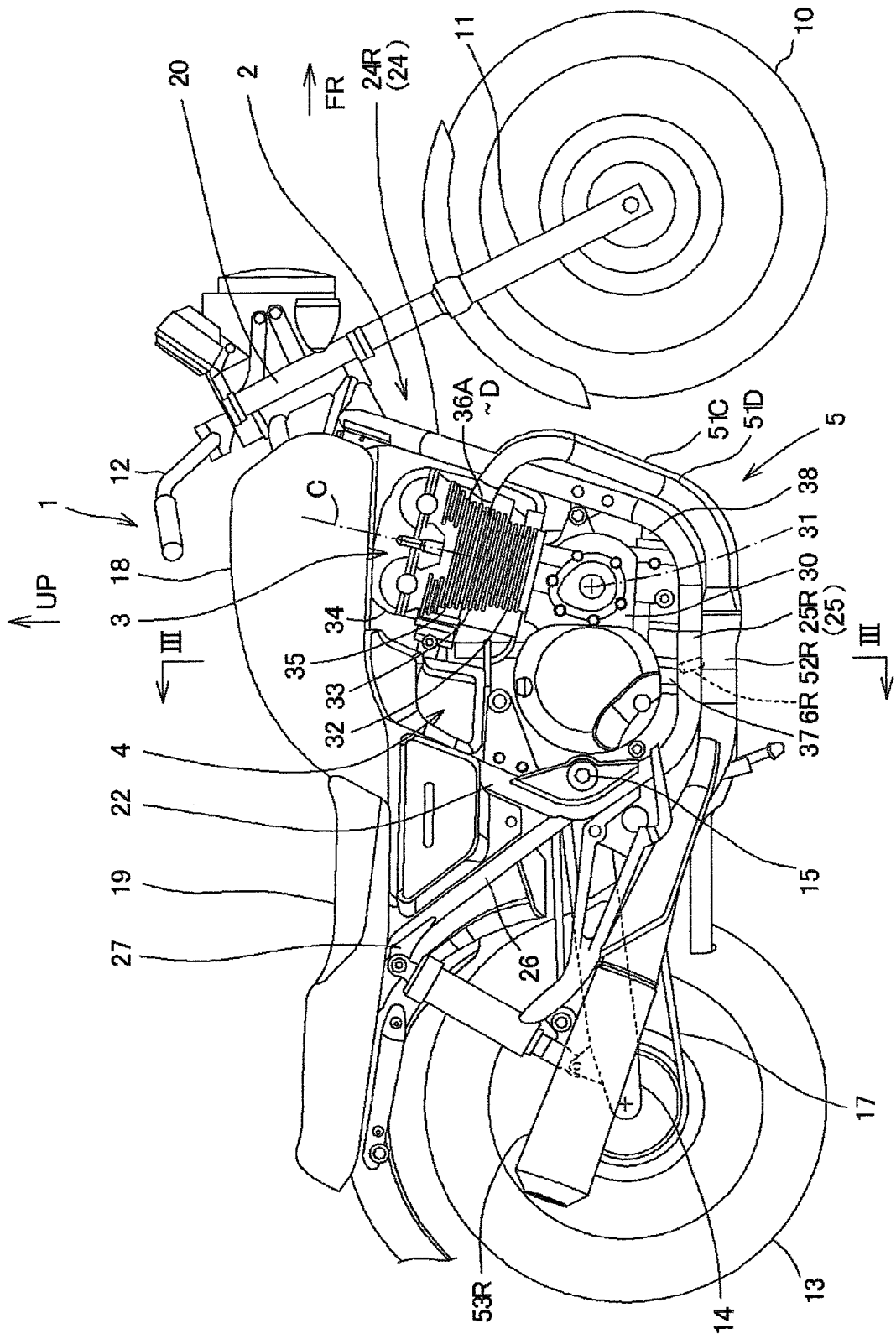
FIG. 2 is a left side view of the motorcycle shown in FIG. 1.

FIG. 1 is a left side view of a motorcycle 1 provided with the exhaust gas sensor arrangement structure according to one embodiment of the invention with a part of a fuel tank broken away. FIG. 2 is a right side view of the same motorcycle 1.

A vehicle body frame 2 of the motorcycle 1 includes a head pipe 20 a pair of left and right main frames 21 extending obliquely rearwardly from the head pipe 20 with a pair of left and right center frames 22 extending downwardly from rear ends of the main frames 21. A pair of left and right auxiliary frames 23 connect the head pipe 20 and the main frames 21 to each other with a pair of left and right down frames 24 extending downwardly from the auxiliary frames 23 in a left and right pair. The left and right down frames 24 are bent rearwardly, extend rearwardly in the horizontal direction and are connected to lower ends of the center frames 22. A pair of left and right seat stays (not shown in the drawing) extends rearwardly from the main frames 21 with a pair of left and right middle frames 26 for connecting center portions of the center frames 22 and the center of the seat stays.

Portions of the down frames 24 extending rearwardly in the horizontal direction after being bent rearwardly, extend along both sides of a lower portion of an internal combustion engine 3 in a left and right pair, extend toward a rear side in the longitudinal direction of a vehicle body, and are connected to the lower ends of the left and right center frames 22. The down frames 24 are particularly referred to as bottom frame portions 25 in this embodiment.

The above-mentioned main frames 21, center frames 22, down frames 24, and seat stays are provided with cross members not shown in the drawing which connect left and right members thereof in place.

A front fork 11 for supporting a front wheel 10 is steerably supported on the head pipe 20 with a steering handle 12 connected to an upper portion of the front fork 11. A swing arm 14 supports a rear wheel 13 supported in a vertically swingable manner on the center frames 22 by means of a pivot bolt 15. Shock absorber units 16 are arranged between connecting portions 27 for connecting the seat stays and the middle frames 26 to each other and to rear forks 14.

The internal combustion engine 3 is supported on the down frames 24, the main frames 21 and the center frames 22. Power of the internal combustion engine 3 is transmitted to the rear wheel 13 through a rear wheel drive chain 17. A fuel tank 18 is mounted on the main frames 21 in a state where the fuel tank 18 is positioned above the internal combustion engine 3. A tandem type seat 19 for a rider and a pillion passenger is mounted on the seat stays.

In this embodiment, the internal combustion engine 3 mounted on the motorcycle 1 is an air-cooled in-line 4-cylinder 4-stroke cycle internal combustion engine. The internal combustion engine 3 includes a transmission at a rear portion in a crankcase 30 thereof as an integral part thereof thus constituting a so-called power unit. The internal combustion engine 3 is mounted on the motorcycle 1 in a state where a crankshaft 31 of the internal combustion engine 3 is directed in the vehicle width direction of the motorcycle 1. More specifically, in the lateral direction of the motorcycle 1.

The internal combustion engine 3 includes a cylinder block 32, a cylinder head 33 and a cylinder head cover 34 in a raised posture above a front portion of the crankcase 30 with a cylinder axis C slightly inclined in the frontward direction. An oil pan 37 is joined to a lower surface of the crankcase 30 by fastening. An oil filter 38 is mounted on the front portion of the crankcase 30.

An intake system 4 is connected to intake ports 35 of four respective cylinders of the internal combustion engine 3 behind the cylinder head 33 of the internal combustion engine 3.

Exhaust pipes 51A to 51D constituting an exhaust system 5 are connected to and extend from exhaust ports 36A to 36D of four respective cylinders which are arranged sequentially from a left side in front of the cylinder head 33, and extend toward a rear side in the longitudinal direction of a vehicle in a state where the exhaust pipes 51A to 51D extend below the internal combustion engine 3.

On the other hand, the down frames 24 are arranged in a state where a left down frame 24L and a right down frame 24R which form a left and right pair extend downward along a front side of the internal combustion engine 3 while being inclined toward a rear side and, thereafter, are bent rearwardly, and extend toward the rear side in the longitudinal direction of a vehicle body while extending below the internal combustion engine 3. More specifically, approximately on both left and right sides of the oil pan 37 as a left bottom frame portion 25L and a right bottom frame portion 25R.

The exhaust pipes 51A, 51B connected to two cylinders on a left side extend from the exhaust ports 36A, 36B on a left side respectively toward a front side of the exhaust ports 36A, 36B in a state where the exhaust pipes 51A, 51B sandwich the left down frame 24L therebetween, are bent downwardly, and extend downwardly along a front side of the left down frame 24L. Thereafter, the exhaust pipes 51A, 51B are bent so that the exhaust pipes 51A, 51B extend below the internal combustion engine 3 from a front side of the internal combustion engine 3 in the longitudinal direction of the vehicle, are merged with each other between the internal combustion engine 3 (oil pan 37) and the left bottom frame portion 25L thus forming a left confluent exhaust pipe 52L ("exhaust pipe" of the invention). The left confluent exhaust pipe 52L extends toward a rear side in the longitudinal direction of the vehicle and is connected to a left muffler 53L arranged on a left side of the rear wheel 13 (see FIGS. 3 and 6).

The exhaust pipes 51C, 51D are connected to two cylinders on a right side and extend from the exhaust ports 36C, 36D on a right side respectively toward a front side of the exhaust ports 36C, 36D in a state where the exhaust pipes 51C, 51D sandwich the right down frame 24R therebetween, are bent downwardly, and extend downwardly along a front side of the right down frame 24R. Thereafter, the exhaust pipes 51C, 51D are bent so that the exhaust pipes 51C, 51D extend below the internal combustion engine 3 from a front side of the internal combustion engine 3 in the longitudinal direction of the vehicle, are merged with each other between the internal combustion engine 3 (oil pan 37) and the right bottom frame portion 25R thus forming a right confluent exhaust pipe 52R ("exhaust pipe" of the invention). The right confluent exhaust pipe 52R extends toward a rear side in the longitudinal direction of the vehicle and is connected to a right muffler 53R arranged on a right side of the rear wheel 13 (see FIGS. 3 and 6).

The plurality of exhaust pipes 51A to 51D are arranged in a state where the exhaust pipes 51A to 51D extend along both left and right sides of the internal combustion engine 3 respectively below the internal combustion engine 3 in a divided manner. Exhaust gas sensors 6L, 6R which detect various values of an exhaust gas are mounted on the left and right confluent exhaust pipes 52L, 52R respectively.

The respective exhaust gas sensors 6L, 6R are formed of, for example, an oxygen sensor which is used for determining a lean (excessive air) region or a rich (excessive fuel) region using a theoretical air-fuel ratio as a boundary, or an LAF (Linear Air Fuel Ratio) sensor which outputs a current value proportional to an air-fuel ratio to an ECU. The detection results acquired by the exhaust gas sensors 6L, 6R are transmitted to the ECU (Engine Control Unit) not shown in the drawing and are used for a combustion control (feedback air-fuel ratio control) of the internal combustion engine 3.

Figure 3:
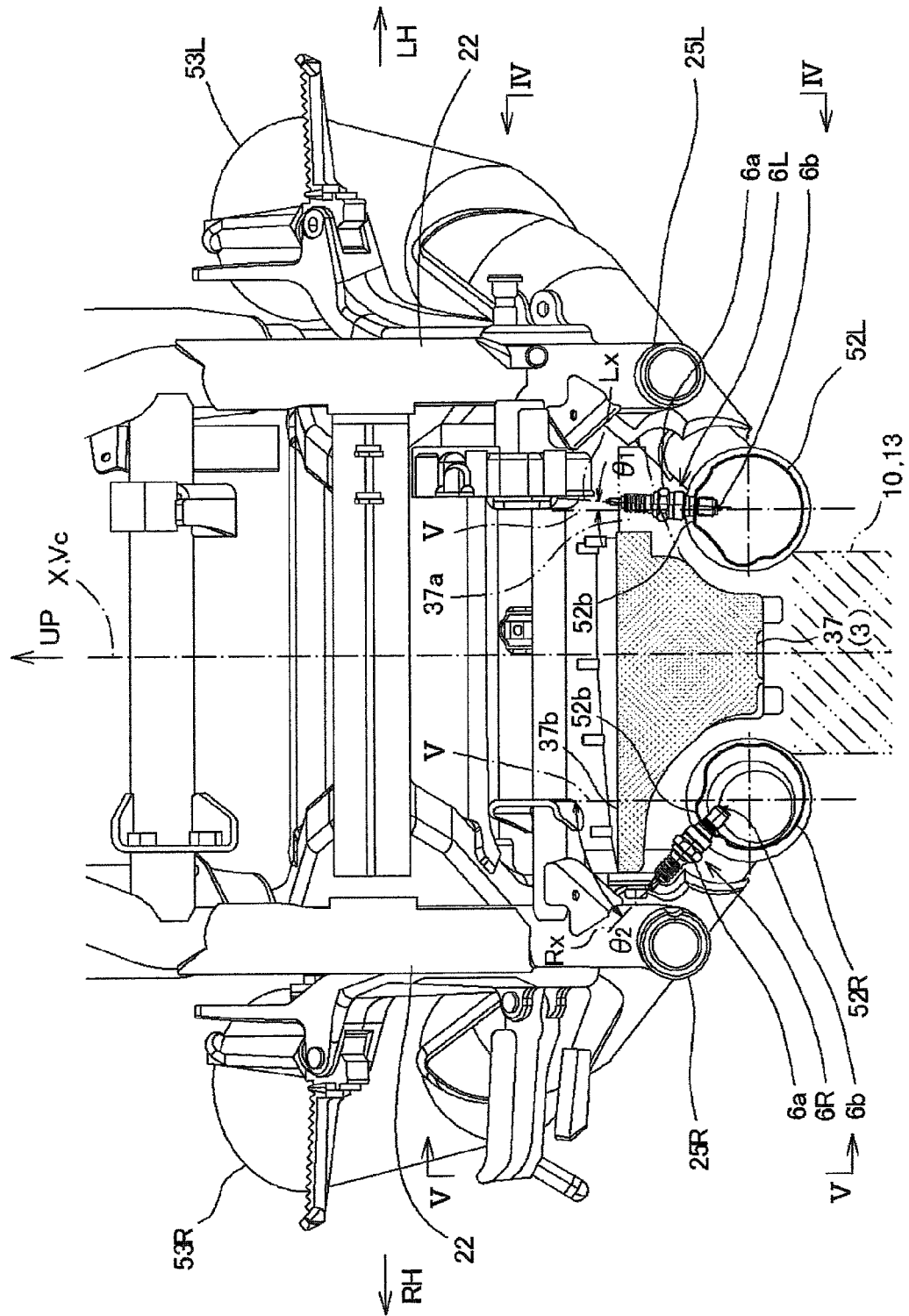
FIG. 3 is a cross-sectional view of the motorcycle as viewed in the direction indicated by an arrow in FIG. 1 and FIG. 2, wherein only an oil pan 37 arranged on a lower portion of an internal combustion engine 3 is shown and other parts of the internal combustion engine 3 are not shown in the drawing.

FIG. 3 is a cross-sectional view of the motorcycle 1 as viewed approximately in the direction indicated by an arrow in FIG. 1 and FIG. 2, and shows the motorcycle 1 as viewed from a front side in the longitudinal direction of the vehicle. In FIG. 3, only the oil pan 37 arranged on the lower portion of the internal combustion engine 3 is shown and other parts of the internal combustion engine 3 are not shown in the drawing.

As shown in FIG. 3, the left exhaust gas sensor 6L is arranged on an upper half of the left confluent exhaust pipe 52L in a state where the left exhaust gas sensor 6L is sandwiched between the internal combustion engine 3 and the left bottom frame portions 25L as viewed from a front side in the longitudinal direction of the vehicle. The right exhaust gas sensor 6R is arranged on an upper half of the right confluent exhaust pipe 52R in a state where the right exhaust gas sensor 6R is sandwiched between the internal combustion engine 3 and the right bottom frame portion 25R as viewed from a front side in the longitudinal direction of the vehicle.

The exhaust gas sensors 6L, 6R are mounted on the confluent exhaust pipes 52L, 52R in a state where sensor bodies 6a penetrate sensor mounting portions 52b of upper walls 52a of the confluent exhaust pipes 52L, 52R respectively (see FIG. 4, FIG. 5), and detection portions 6b are exposed to the inside of the confluent exhaust pipes 52L, 52R respectively.

Accordingly, the left exhaust gas sensor 6L has a lower side thereof surrounded by the left confluent exhaust pipe 25L and both sides thereof surrounded by the internal combustion engine 3 and the left bottom frame portion 25L in a state where the left exhaust gas sensor 6L is arranged close to the left confluent exhaust pipe 25L, the internal combustion engine 3 and the left bottom frame portion 25L. The right exhaust gas sensor 6R has a lower side thereof surrounded by the right confluent exhaust pipe 25R and both sides thereof surrounded by the internal combustion engine 3 and the right bottom frame portion 25R in a state where the right exhaust gas sensor 6R is arranged close to the right confluent exhaust pipe 25R, the internal combustion engine 3 and the right bottom frame portion 25R. Accordingly, it is possible to protect the left and right exhaust gas sensors 6L, 6R by making use of the members around the left and right exhaust gas sensors 6L, 6R.

A center axis Lx of the left exhaust gas sensor 6L is arranged with an upper portion thereof inclined toward the outside in the vehicle width direction at an angle θ1 at which the center axis Lx intersects with a vertical line V such that the center axis Lx is directed toward a position between the internal combustion engine 3 and the left bottom frame portion 25L. A center axis Rx of the right exhaust gas sensor 6R is arranged with an upper portion thereof inclined toward the outside in the vehicle width direction at an angle θ2 at which the center axis Rx intersects with the vertical line V such that the center axis Rx is directed toward a position between the internal combustion engine 3 and the right bottom frame portion 25R.

That is, the center axes Lx, Rx of the left and right exhaust gas sensors 6L, 6R are arranged with the upper portions thereof inclined toward the outside in the vehicle width direction with respect to a vehicle center vertical line Vc.

In this manner, the center axes Lx, Rx of the left and right exhaust gas sensors 6L, 6R are arranged with the upper portions thereof inclined toward the outside with respect to the vehicle center vertical line Vc. Thus, as viewed from the sides of the front and rear wheels 10, 13 arranged at the center X in the vehicle width direction of the motorcycle 1 (see FIGS. 1, 2 and 6), areas of the exhaust gas sensors 6L, 6R covered with the confluent exhaust pipes 52L, 52R can be increased so that the exhaust gas sensors 6L, 6R can be protected more effectively.

Further, the left and right exhaust gas sensors 6L, 6R can be arranged away from the internal combustion engine. Thus, a thermal effect on the exhaust gas sensors 6L, 6R can be suppressed.

In this embodiment, the inclination angles θ1, θ2 on sides at which the center axes Lx, Rx of the left and right exhaust gas sensors 6L, 6R intersect with the vertical line V at an acute angle are set to angles which do not exceed approximately ½ of a right angle (45°) as shown in the drawing. Accordingly, the left and right exhaust gas sensors 6L, 6R can be surely protected from matters scattering from below the internal combustion engine 3 and from the front wheel 10 by the left and right exhaust pipes 51A, 51B, the confluent exhaust pipe 52L, the exhaust pipes 51C, 51D, and the confluent exhaust pipe 52R.

As described above, the left and right confluent exhaust pipes 52L, 52R which constitute the plurality of exhaust pipes are arranged in a state where the confluent exhaust pipes 52L, 52R extend below the internal combustion engine 3 on both left and right sides respectively, and the left and right exhaust gas sensors 6L, 6R are arranged respectively on the confluent exhaust pipes 52L, 52R on both left and right sides in an inclined manner with respect to the vertical direction V. Accordingly, both the left and right exhaust gas sensors 6L, 6R can be protected by the internal combustion engine 3 and the bottom frame portion.

The oil pan 37 shown in FIG. 3 is arranged on the lower portion of the internal combustion engine 3. The oil pan 37 is formed asymmetrically in the lateral direction with respect to the center X in the vehicle width direction. The oil pan 37 is formed in a downwardly projecting manner between the left and right confluent exhaust pipes 52L, 52R which extend below the internal combustion engine 3 on both left and right sides. The left and right confluent exhaust pipes 52L, 52R are arranged respectively between the oil pan 37 and the left and right bottom frame portions 25L, 25R.

Accordingly, the left and right exhaust gas sensors 6L, 6R provided on left and right side of the oil pan 37 which projects downwardly below the internal combustion engine 3 are arranged with the inclination angles θ1, θ2 of the center axes Lx, Rx with respect to the vertical line V and are made different from each other so as to avoid interference of the exhaust gas sensors 6L, 6R with the oil pan 37 that has a laterally asymmetrical shape. Accordingly, the oil pan 37 and the left and right bottom frame portions 25L, 25R can protect the left and right exhaust gas sensors 6L, 6R in a cooperative manner.

Also in the case where the oil pan 37 is formed in a left and right symmetry with respect to the center X in the vehicle width direction at the lower portion of the internal combustion engine 3, the oil pan 37 is formed in a downwardly projecting manner between the left and right confluent exhaust pipes 52L, 52R which extend below the internal combustion engine 3 on both left and right sides. The left and right confluent exhaust pipes 52L, 52R are arranged between the oil pan 37 and the left and right bottom frame portions 25L, 25R respectively. Accordingly, by suitably setting the inclination angles θ1, θ2 of the center axes Lx, Rx with respect to the vertical line V respectively so as to avoid interference of the left and right exhaust gas sensors 6L, 6R with the oil pan 37 in left and right symmetry, the oil pan 37 and the left and right bottom frame portions 25L, 25R can protect the left and right exhaust gas sensors 6L, 6R in a cooperative manner.

Figure 4:
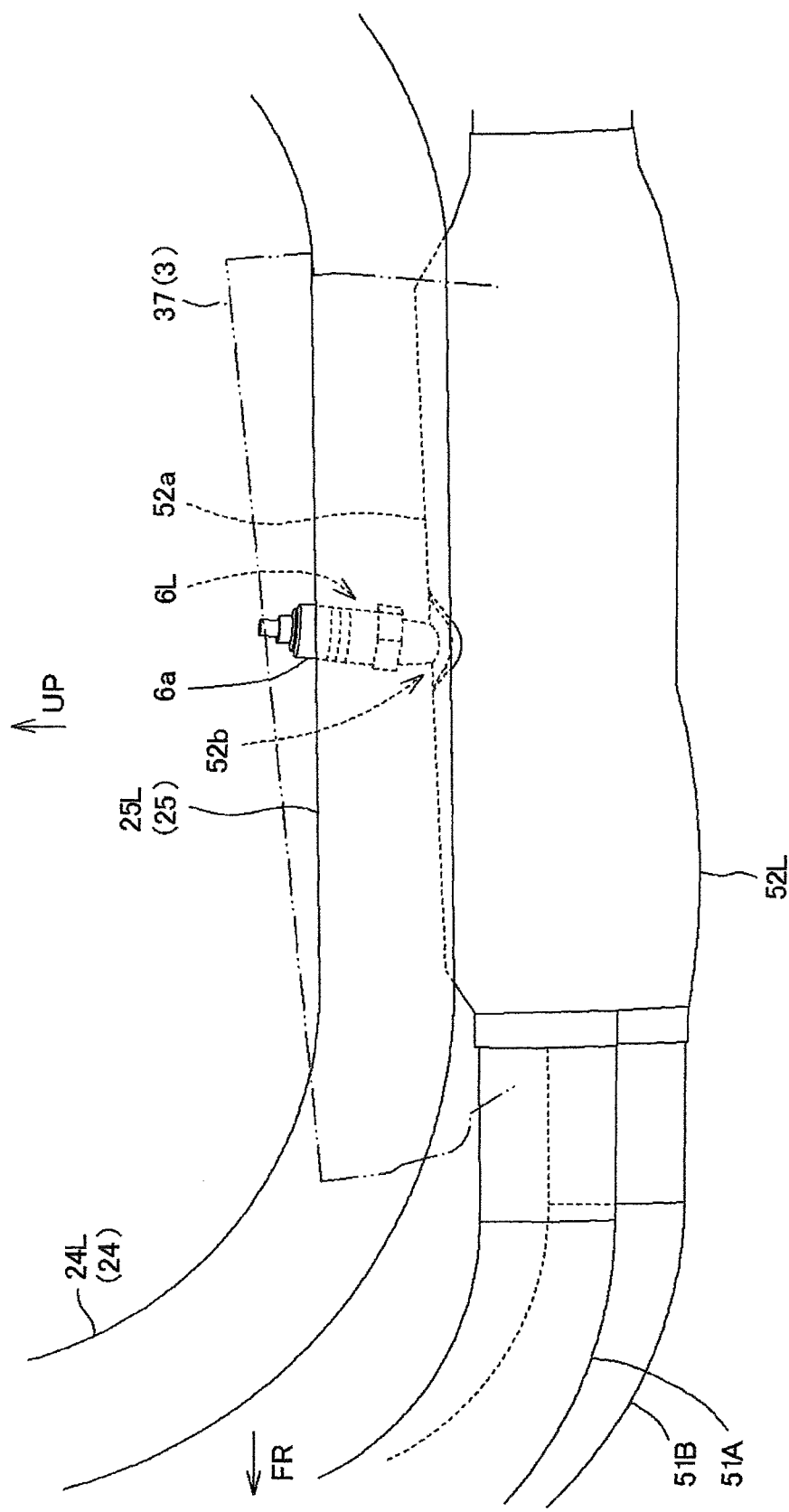
FIG. 4 is an explanatory view showing the positional relationship between a left bottom frame portion, a left confluent exhaust pipe, and a left exhaust gas sensor as viewed in the direction indicated by an arrow IV-IV in FIG. 3, wherein only the oil pan of the internal combustion engine is shown in the drawing by a double-dashed chain line, and other parts of the internal combustion engine are not shown.
Figure 5:
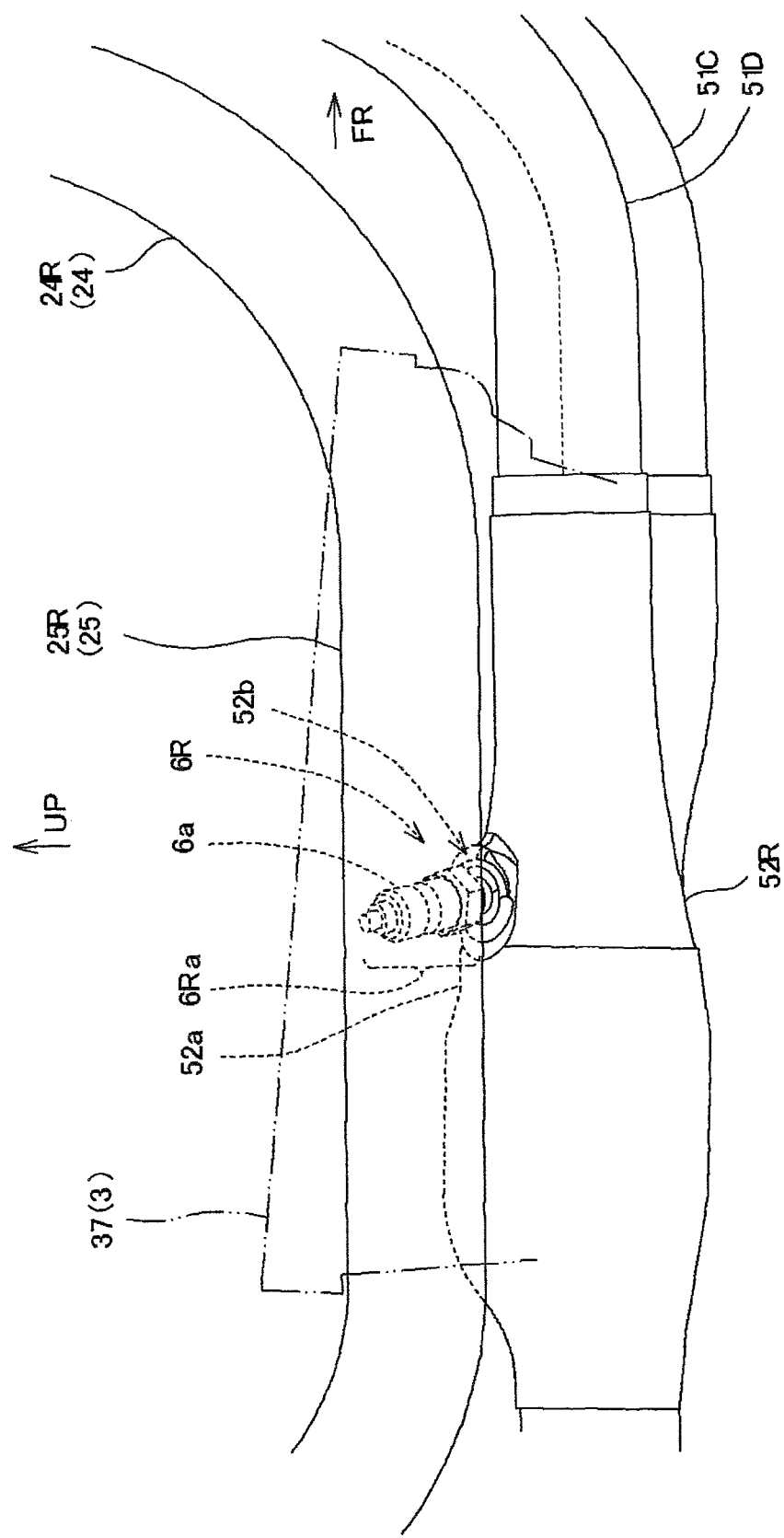
FIG. 5 is an explanatory view showing the positional relationship between a right bottom frame portion, a right confluent exhaust pipe, and a right exhaust gas sensor as viewed in the direction indicated by an arrow V-V in FIG. 3, wherein only the oil pan of the internal combustion engine is shown in the drawing by a double-dashed chain line, and other parts of the internal combustion engine are not shown in the drawing.

FIG. 4 is a view as viewed in the direction indicated by an arrow IV-IV in FIG. 3 showing the positional relationship between the left bottom frame portion 25L, the left confluent exhaust pipe 52L and the left exhaust gas sensor 6L. In FIG. 4, with respect to the internal combustion engine 3, only the oil pan 37 is shown by a double-dashed chain line, and other parts of the internal combustion engine 3 are not shown in the drawing. FIG. 5 is a view as viewed in the direction indicated by an arrow V-V in FIG. 3 and shows the positional relationship between the right bottom frame portion 25R, the right confluent exhaust pipe 52R, and the right exhaust gas sensor 6R. Also in FIG. 5, with respect to the internal combustion engine 3, only the oil pan 37 of the internal combustion engine 3 is shown by a double-dashed chain line, and other parts of the internal combustion engine 3 are not shown in the drawing.

As shown in FIGS. 4 and 5, portions of the upper halves of the left and right confluent exhaust pipes 52L, 52R overlap with the left and right bottom frame portions 25L, 25R respectively as viewed in a side view. The exhaust gas sensors 6L, 6R are arranged such that sensor mounting portions 52b formed on the left and right confluent exhaust pipes 52L, 52R for mounting the exhaust gas sensors 6L, 6R are positioned respectively in ranges where portions of the upper halves of the left and right confluent exhaust pipes 52L, 52R overlap with the left and right bottom frame portions 25L, 25R. The left and right exhaust gas sensors can be protected by covering the side surfaces of the exhaust gas sensors 6L, 6R with the left and right bottom frame portions 25L, 25R respectively.

More particularly, as shown in FIG. 5, the exhaust gas sensor 6R is arranged on the right confluent exhaust pipe 52R such that a side of the whole exposure portion 6Ra of the right exhaust gas sensor 6R which is exposed from the right confluent exhaust pipe 52R is covered with the right bottom frame 25R as viewed in a side view. Accordingly, the right exhaust gas sensor 6R can be more sufficiently protected from the side.

Figure 6:
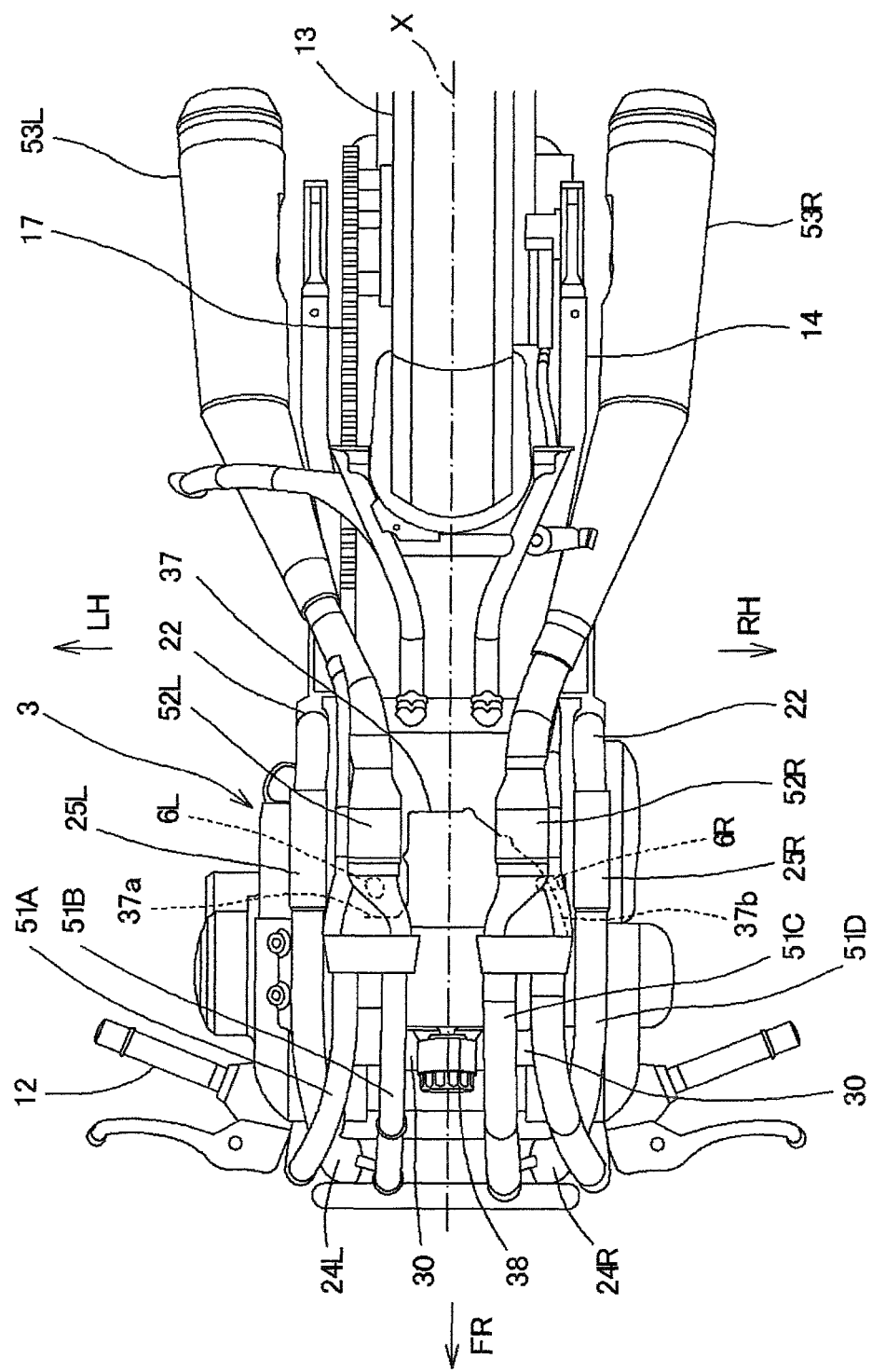
FIG. 6 is a bottom plan view of a center portion of the motorcycle as viewed in the direction indicated by an arrow VI-VI in FIG. 1.

FIG. 6 is a bottom plan view of a center portion of the motorcycle 1 as viewed in the direction indicated by an arrow VI-VI in FIG. 1.

The exhaust pipes 51A, 51B of the internal combustion engine 3 extend in a forward direction from the internal combustion engine 3 in a state where the exhaust pipes 51A, 51B sandwich the left down frame 24L therebetween and, thereafter, are bent downwardly, are bent in a state where the exhaust pipes 51A, 51B extend below the internal combustion engine 3 from the front side of the internal combustion engine 3 in the longitudinal direction of the vehicle 3 and are merged with each other between the internal combustion engine 3 and the left bottom frame portion 25L thus forming the left confluent exhaust pipe 52L. The left confluent exhaust pipe 52L extends toward a rear side in the longitudinal direction of the vehicle and is connected to the left muffler 53L arranged on the left side of the rear wheel 13. The exhaust pipes 51C, 51D extend in a forward direction from the internal combustion engine 3 in a state where the exhaust pipes 51C, 51D sandwich the right down frame 24R therebetween and, thereafter, are bent downwardly, are bent in a state where the exhaust pipes 51C, 51D extend below the internal combustion engine 3 from the front side of the internal combustion engine 3 in the longitudinal direction of the vehicle 3 and are merged with each other between the internal combustion engine 3 and the right bottom frame portion 25R thus forming the right confluent exhaust pipe 52R. The right confluent exhaust pipe 52R extends toward the rear side in the longitudinal direction of the vehicle and is connected to the right muffler 53R arranged on the right side of the rear wheel 13.

The approximate positions of the left and right exhaust gas sensors 6L, 6R are indicated by a broken line in the drawing.

On the other hand, the left down frame 24L and the right down frame 24R which form a left and right pair extend downward along the front side of the internal combustion engine 3 are inclined toward a rear side and, thereafter, are bent toward the rear side thus forming the left bottom frame portion 25L and the right bottom frame portion 25R. The left bottom frame portion 25L and the right bottom frame portion 25R extend toward the rear side in the longitudinal direction of a vehicle body while extending below the internal combustion engine 3, that is, approximately on both left and right sides of the oil pan 37 and are connected to the left and right center frames 22.

The oil pan 37 is formed in a state where the oil pan 37 bulges in the vehicle width direction in front of the exhaust gas sensors 6L, 6R and is mounted on the lower portion of the crankcase 30.

Figure 7:
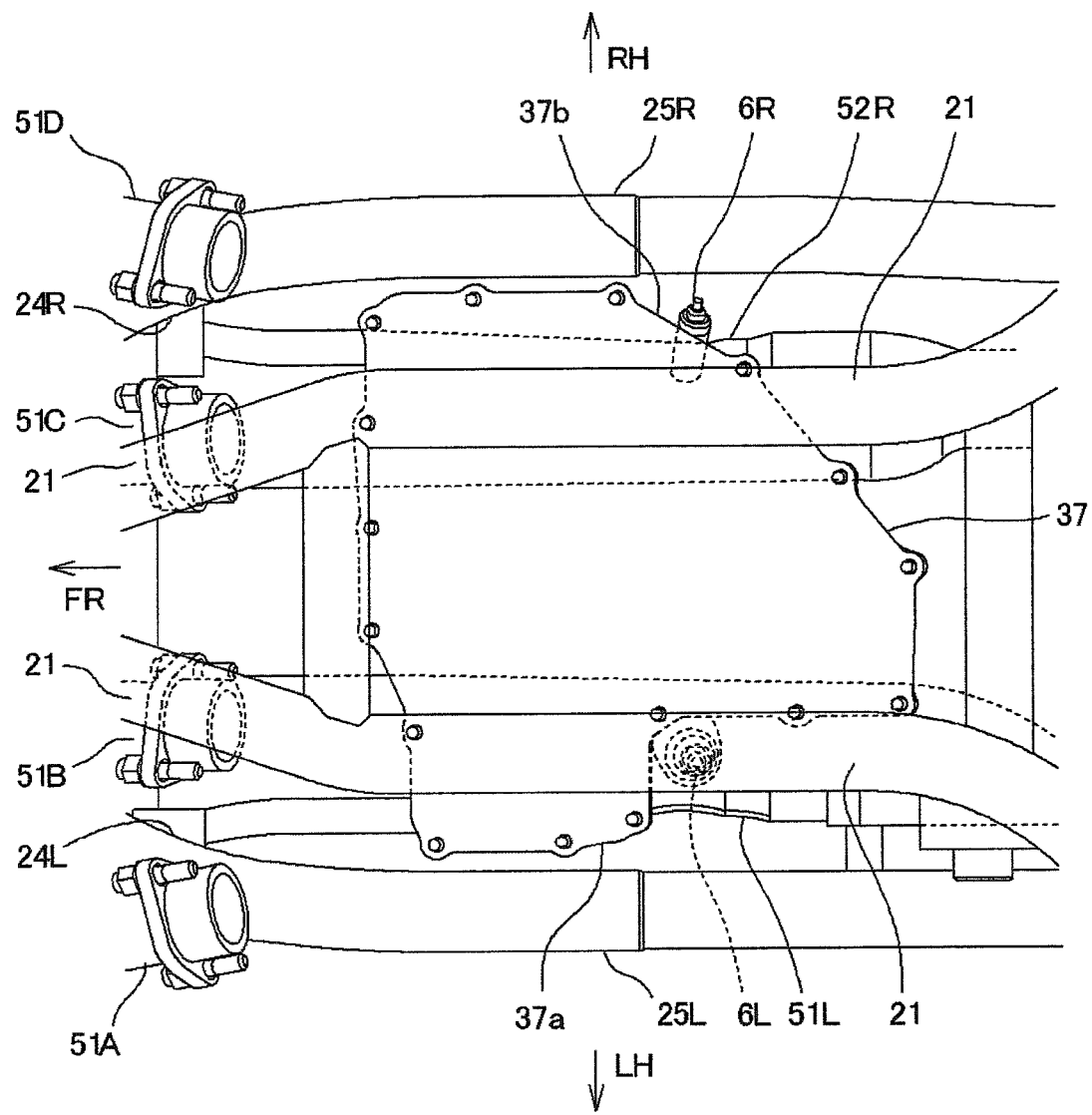
FIG. 7 is a plan view of an essential part of the center portion of the motorcycle as viewed in the direction indicated by an arrow VII-VII in FIG. 1 in a state where a fuel tank and the like are removed, wherein only the oil pan of the internal combustion engine is shown in the drawing, and other parts of the internal combustion engine are not shown in the drawing.

FIG. 7 is a plan view of an essential part of the center portion of the motorcycle 1 as viewed in the direction indicated by an arrow VII-VII in FIG. 1 in a state where the fuel tank 18 and the like are removed. FIG. 7 shows the positional relationship among the respective exhaust pipes 51A to 51D, the left and right confluent exhaust pipes 52L, 52R, the main frames 21, the left and right bottom frame portions 25L, 25R and the left and right exhaust gas sensors 6L, 6R. With respect to the internal combustion engine 3, only the oil pan 37 arranged on the lowermost portion of the internal combustion engine 3 is shown, and other parts of the internal combustion engine are not shown.

Also FIG. 7 shows that the oil pan 37 is arranged in a state where the oil pan 37 is formed so as to bulge in the vehicle width direction in front of the exhaust gas sensors 6L, 6R.

Accordingly, as viewed from a front side in the longitudinal direction of the vehicle, front surfaces of the left and right exhaust gas sensors 6L, 6R are covered with the left and right bulging portions 37a, 37b of the oil pan 37 and the exhaust gas sensors 6L, 6R are covered with the bulging portions of the oil pan 37 which bulge in the vehicle width direction. As a result, the left and right exhaust gas sensors 6L, 6R can be protected from a front side by thus arranging the left and right exhaust gas sensors 6L, 6R.

Although one embodiment of the invention has been explained heretofore, it is needless to say that the mode of the invention is not limited to the above-mentioned embodiment, and the invention can be carried out in various modes without departing from the gist of the invention.

For example, the motorcycle according to the invention is not limited to the motorcycle of the embodiment. More specifically, any motorcycle which includes the features set forth in the claims may be used as the motorcycle according to the invention. The number of cylinders of the internal combustion engine is not limited provided that the number of cylinders is plural regardless of the internal combustion engine being an air-cooled engine or a water-cooled engine.

Further, the lateral arrangement of the respective equipment is described specifically with respect to the equipment shown in the drawing for the sake of convenience. However, the invention also includes the arrangement of the respective equipment which is opposite to the arrangement of the respective equipment described in the embodiment in the lateral direction.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. An exhaust gas sensor arrangement structure for a motorcycle comprising:
   a vehicle body frame;
   an internal combustion engine suspended on the vehicle body frame between front and rear wheels;
   exhaust pipes extending toward a rear side in the longitudinal direction of a vehicle from a front side of the internal combustion engine in the longitudinal direction of the vehicle in a state where the exhaust pipes extend below the internal combustion engine;
   wherein the vehicle body frame includes a pair of left and right bottom frame portions extending toward a rear side in the longitudinal direction of a vehicle body while extending along both sides of a lower portion of the internal combustion engine; and
   exhaust gas sensors arranged on upper halves of the exhaust pipes arranged between the internal combustion engine and the bottom frame portions as viewed from a front side in the longitudinal direction of the vehicle in a state where the exhaust gas sensors are sandwiched between the internal combustion engine and the bottom frame portions as viewed from a front side in the longitudinal direction of the vehicle,
wherein center axes of the exhaust gas sensors are arranged with upper portions thereof inclined toward the outside in the vehicle width direction with respect to a vehicle center vertical line in a state where the center axes are directed toward positions between the internal combustion engine and the bottom frame portions, and
wherein a plurality of exhaust pipes are arranged in a state where the exhaust pipes extend along both left and right sides of the internal combustion engine below the internal combustion engine respectively, and the exhaust gas sensors are arranged on the exhaust pipes on both left and right sides in an inclined manner with respect to the vertical direction.

2. The exhaust gas sensor arrangement structure for a motorcycle according to claim 1, wherein angles at which the center axes of the exhaust gas sensors intersect with the vertical line are set to angles which do not exceed approximately ½ of a right angle on an acute angle making side.

3. The exhaust gas sensor arrangement structure for a motorcycle according to claim 1, wherein an oil pan is arranged on a lower portion of the internal combustion engine, and the exhaust pipes are arranged between the oil pan and the bottom frame portions; and
the oil pan is formed asymmetrically in the lateral direction with respect to the center in the vehicle width direction, and projects downwardly between the exhaust pipes which extend along both left and right sides of the internal combustion engine below the internal combustion engine, and the exhaust gas sensors are arranged with the inclination angles of the center axes with respect to the vertical line made different from each other so as to avoid interference with the oil pan.

4. The exhaust gas sensor arrangement structure for a motorcycle according to claim 1, wherein portions of the upper halves of the exhaust pipes overlap with the bottom frame portions respectively as viewed in a side view, and sensor mounting portions for the exhaust gas sensors are arranged in an overlapping range.

5. The exhaust gas sensor arrangement structure for a motorcycle according to claim 2, wherein portions of the upper halves of the exhaust pipes overlap with the bottom frame portions respectively as viewed in a side view, and sensor mounting portions for the exhaust gas sensors are arranged in an overlapping range.

6. The exhaust gas sensor arrangement structure for a motorcycle according to claim 3, wherein portions of the upper halves of the exhaust pipes overlap with the bottom frame portions respectively as viewed in a side view, and sensor mounting portions for the exhaust gas sensors are arranged in an overlapping range.

7. The exhaust gas sensor arrangement structure for a motorcycle according to claim 3, wherein the oil pan is formed in a state where the oil pan bulges in the vehicle width direction in front of the exhaust gas sensors, and the exhaust gas sensors are covered with bulging portions of the oil pan as viewed from a front side in the longitudinal direction of the vehicle.

8. An exhaust gas sensor arrangement structure for a motorcycle comprising:
a vehicle body frame:
an internal combustion engine suspended on the vehicle body frame between front and rear wheels;
exhaust pipes extending toward a rear side in the longitudinal direction of a vehicle from a front side of the internal combustion engine in the longitudinal direction of the vehicle in a state where the exhaust pipes extend below the internal combustion engine;
wherein the vehicle body frame includes a pair of left and right bottom frame portions extending toward a rear side in the longitudinal direction of a vehicle body while extending along both sides of a lower portion of the internal combustion engine; and
exhaust gas sensors arranged on upper halves of the exhaust pipes arranged between the internal combustion engine and the bottom frame portions as viewed from a front side in the longitudinal direction of the vehicle in a state where the exhaust gas sensors are sandwiched between the internal combustion engine and the bottom frame portions as viewed from a front side in the longitudinal direction of the vehicle,
wherein portions of the upper halves of the exhaust pipes overlap with the bottom frame portions respectively as viewed in a side view, and sensor mounting portions for the exhaust gas sensors are arranged in an overlapping range.

9. The exhaust gas sensor arrangement structure for a motorcycle according to claim 8, wherein one of the exhaust gas sensors is arranged on a corresponding one of the exhaust pipes in a state where the whole of an exposure portion of one of the exhaust gas sensors which is exposed from the exhaust pipe is covered with the bottom frame as viewed in a side view.

10. The exhaust gas sensor arrangement structure for a motorcycle according to claim 8, wherein an oil pan is formed in a state where the oil pan bulges in the vehicle width direction in front of the exhaust gas sensors, and the exhaust gas sensors are covered with bulging portions of the oil pan as viewed from a front side in the longitudinal direction of the vehicle.

11. The exhaust gas sensor arrangement structure for a motorcycle according to claim 9, wherein an oil pan is formed in a state where the oil pan bulges in the vehicle width direction in front of the exhaust gas sensors, and the exhaust gas sensors are covered with bulging portions of the oil pan as viewed from a front side in the longitudinal direction of the vehicle.

12. An exhaust gas sensor arrangement structure for a motorcycle comprising:
exhaust pipes extending toward a rear side in the longitudinal direction of a vehicle from a front side of an internal combustion engine in the longitudinal direction of the vehicle in a state where the exhaust pipes extend below the internal combustion engine;
a pair of left and right bottom frame portions extending toward a rear side of the motorcycle in the longitudinal direction while extending along both sides of a lower portion of the internal combustion engine; and
exhaust gas sensors arranged on upper halves of the exhaust pipes arranged between the internal combustion engine and the bottom frame portions as viewed from a front side in the longitudinal direction of the motorcycle in a state where the exhaust gas sensors are sandwiched between the internal combustion engine and the bottom frame portions as viewed from a front side in the longitudinal direction of the motorcycle,
wherein center axes of the exhaust gas sensors are arranged with upper portions thereof inclined toward the outside in the motorcycle width direction with respect to a motorcycle center vertical line in a state where the center axes are directed toward positions between the internal combustion engine and the bottom frame portion, and wherein a plurality of exhaust pipes are arranged in a state where the exhaust pipes extend along both left and right sides of the internal combustion engine below the internal combustion engine respectively, and the exhaust gas sensors are arranged on the exhaust pipes on both left and right sides in an inclined manner with respect to the vertical direction.

13. The exhaust gas sensor arrangement structure for a motorcycle according to claim 12, wherein angles at which the center axes of the exhaust gas sensors intersect with the vertical line are set to angles which do not exceed approximately ½ of a right angle on an acute angle making side.

14. The exhaust gas sensor arrangement structure for a motorcycle according to claim 12, wherein an oil pan is arranged on a lower portion of the internal combustion engine, and the exhaust pipes are arranged between the oil pan and the bottom frame portions; and the oil pan is formed asymmetrically in the lateral direction with respect to the center in the vehicle width direction, and projects downwardly between the exhaust pipes which extend along both left and right sides of the internal combustion engine below the internal combustion engine, and the exhaust gas sensors are arranged with the inclination angles of the center axes with respect to the vertical line made different from each other so as to avoid interference with the oil pan.

* * * * *